United States Patent [19]

Chase, Jr.

[11] 4,315,326
[45] Feb. 9, 1982

[54] INERTIAL MEASUREMENT UNDERWATER TRACKING SYSTEM

[75] Inventor: Jay V. Chase, Jr., Poulsbo, Wash.

[73] Assignee: The United States of America as represented by the Secretary of the Navy, Washington, D.C.

[21] Appl. No.: 202,518

[22] Filed: Oct. 31, 1980

[51] Int. Cl.³ .......................................... H04B 11/00
[52] U.S. Cl. .............................. 367/134; 73/178 R; 367/907
[58] Field of Search ............... 367/131, 133, 134, 137, 367/907; 73/178 R; 114/20 R

[56] References Cited

U.S. PATENT DOCUMENTS 3,205,475 9/1965 Foss ..................................... 367/907

Primary Examiner—Richard A. Farley
Attorney, Agent, or Firm—R. S. Sciascia; Charles D. B. Curry

[57] ABSTRACT

An inertial measurement underwater tracking system which determines range position onboard an underwater vehicle using inertial navigation techniques. The system uses acoustic telemetry to relay the range position from the vehicle to an operations site. The position data is also recorded onboard the vehicle for post-run analysis. An onboard computer receives the inertial measurements from an inertial measurement unit and computes vehicle position with respect to an initialized reference. An acoustic transmitter receives the measurements, formats the data and transmits it by acoustic telemetry. An underwater hydrophone receives the acoustic telemetry and inputs the data to an acoustic processor to reconstruct the original position data. A range computer processes in real-time the data, and displays and records the time history of vehicle location on the range. After recovery the onboard recorded data is played back into the range computer to provide a maximum accuracy, continuous vehicle-run history.

14 Claims, 2 Drawing Figures

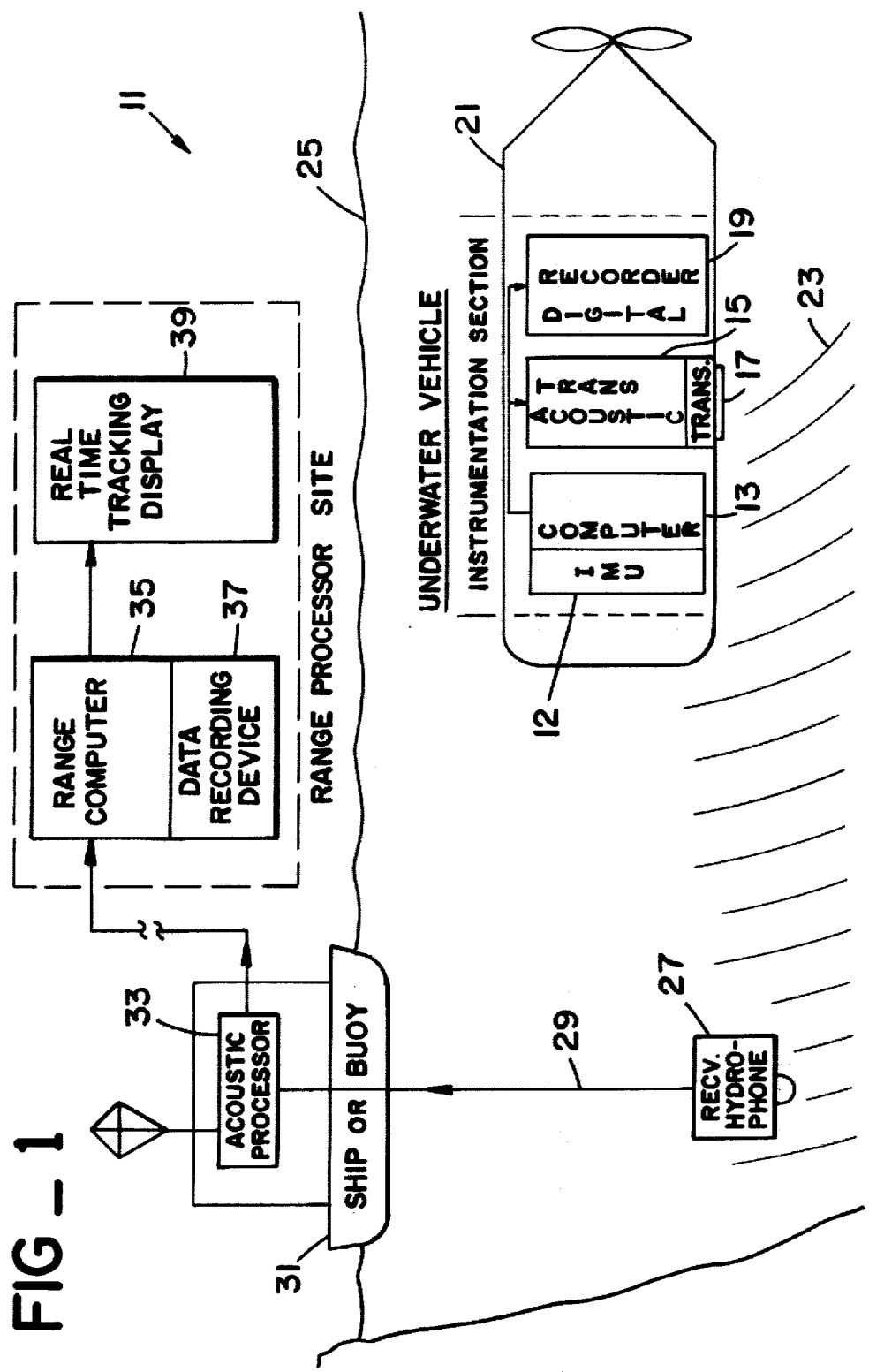

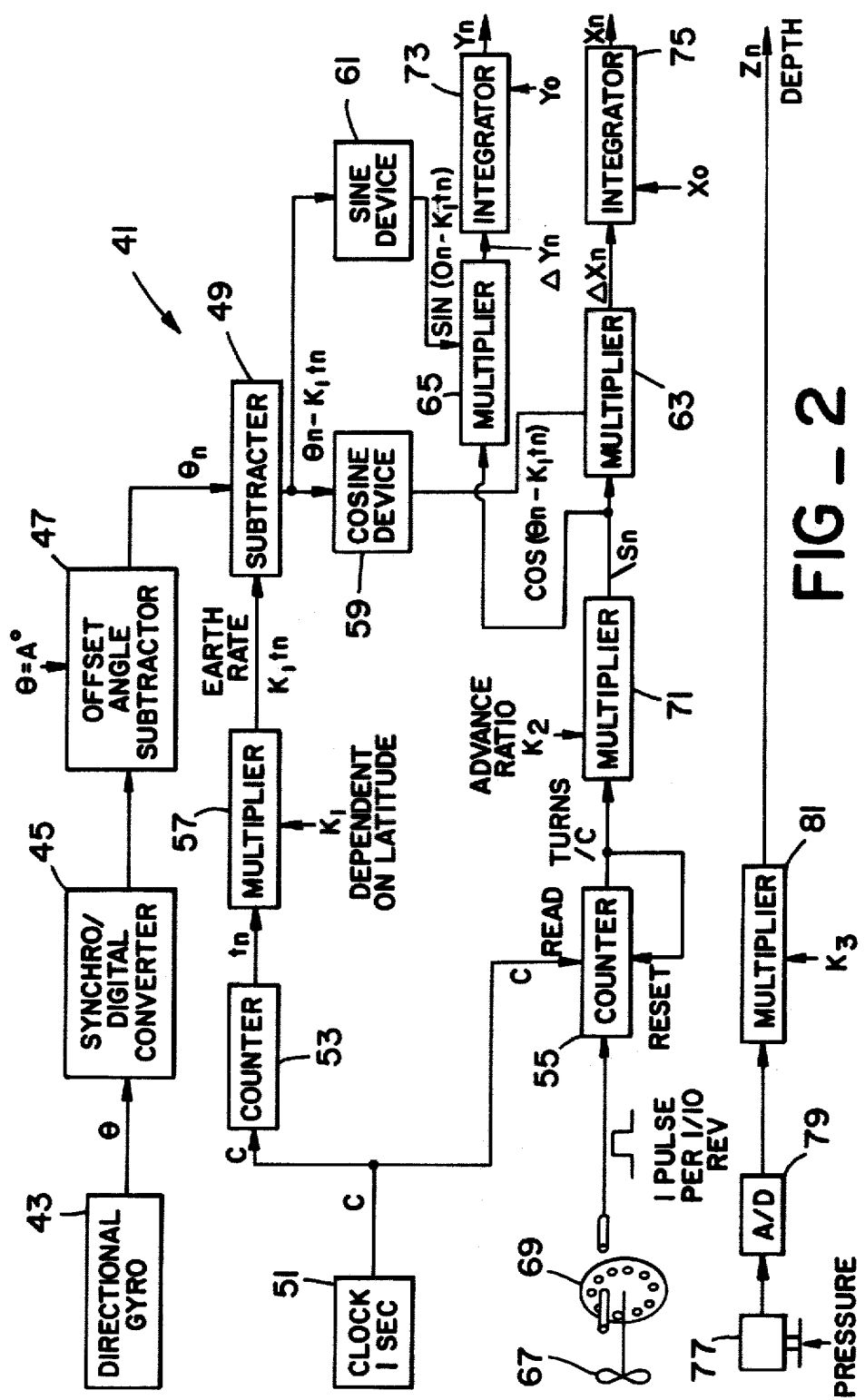
FIG_2

INERTIAL MEASUREMENT UNDERWATER TRACKING SYSTEM

BACKGROUND OF THE INVENTION

1. Field of the Invention

The present invention relates to an underwater tracking system and more particularly to an underwater tracking system using inertial measurement techniques.

2. Description of the Prior Art

Underwater tracking ranges are used throughout the world to facilitate the research, engineering, test and evaluation of underwater vehicles. Traditionally, the task of tracking underwater vehicles has been accomplished using underwater acoustic triangulation systems. In these systems acoustic pulses are transmitted from the underwater vehicle and received by a plurality (usually four) of underwater hydrophones. By measuring arrival time of the acoustic pulse at these hydrophones the position of the vehicles can be calculated. Although the performance of acoustic tracking systems is at most times adequate, limitations exist which preclude the effective adaptation of acoustic triangulation technology to advanced ranging requirements. For example, acoustic triangulation systems have proved to be too expensive for large area tactical ranges. These systems also have cost and technical limitations which deter their effective utilization in shallow water ranges. Moreover, the requirement of a relatively large number of accurately located hydrophones precludes their effective use in portable range systems.

The present invention overcomes these problems by providing a highly effective, low cost underwater tracking system using an inertial measurement system on the underwater vehicle. This eliminates the need for precisely located fixed underwater sensors since all of the information concerning vehicle location is being measured on the vehicle and may be transmitted to a single hydrophone.

SUMMARY OF THE INVENTION

Briefly the present invention comprises an inertial measurement underwater tracking system which determines range position onboard an underwater vehicle using inertial navigation techniques. The system uses acoustic telemetry to relay the range position from the vehicle to an operations site. The position data is also recorded onboard the vehicle for post-run analysis. An onboard computer receives the inertial measurements from an inertial measurement unit and computes vehicle position with respect to an initialized reference. An acoustic transmitter receives the measurements, formats the data and transmits it by acoustic telemetry. An underwater hydrophone receives the acoustic telemetry and inputs the data to an acoustic processor to reconstruct the original position data. A range computer processes in real-time the data and displays and records the time history of vehicle location on the range. After recovery the onboard recorded data is played back into the range computer to provide a maximum accuracy, continuous vehicle-run history.

STATEMENT OF THE OBJECTS OF THE INVENTION

An object of the present invention is to provide an effective underwater tracking system that employs inertial measurement techniques on the underwater vehicle.

A further object of the present invention is to provide a highly portable underwater tracking system.

A still further object of the present invention is to provide an underwater tracking system that transmits position information from the underwater vehicle to a single underwater receiver.

Other objects, advantages and novel features will be apparent from the following detailed description when read in conjunction with the appended claims and attached drawing.

BRIEF DESCRIPTION OF THE DRAWINGS

FIG. 1 is a schematic drawing of the inertial measurement underwater tracking system of the present invention.

FIG. 2 is a schematic diagram of a specific implementation of the system shown in FIG. 1.

DESCRIPTION OF THE PREFERRED EMBODIMENT

In FIG. 1 is schematically illustrated the overall inertial measurement underwater tracking system 11 of the present invention. The system employs an inertial measurement unit 12, a computer 13, an acoustic transmitter 15, a transducer 17 and a digital recorder 19. This equipment is mounted in the instrumentation section on the underwater vehicle, such as a torpedo 21. The output of the inertial measurement unit 12 is digitized and applied to the input of computer 13, the output of which is applied in parallel to the acoustic transmitter 15 and to the digital recorder 19. The output of the transmitter 15 is applied to the input of transducer 17 which generates an acoustic signal 23 that is transmitted through the water to a single hydrophone receiver 27. Hydrophone receiver 27 is suspended in the water by cable 29 from ship or buoy 31 and its electrical signal is connected to the input of acoustic processor 33. The output of the acoustic processor 33 is processed by range computer 35 which may be on board ship 31 or land based. When a buoy is used in place of a ship, the output of acoustic processor 33 is preferably transmitted to a land based range computer. The data transmission to the land based computer may be by cable, radio, laser, satellite, acoustic link, or the like. The output of range computer 35 may be recorded in recording device 37 and/or displayed in real-time tracking device 39.

The inertial measurement underwater tracking system 11 of the present invention shifts the emphasis of the tracking task from an external hardware approach to an internal or onboard hardware approach. Through the use of onboard inertial measurement system, the underwater vehicle measures its own positional translation with respect to a known initialized reference as may be established by the launching vehicle. The position information is transmitted to the range computer where it is translated into range coordinates for real-time tracking. Inertial data recorded in digital recorder 19 provides high accuracy continuous tracking data for post-run analysis.

Inertial measurement unit 12 measures the inertial forces acting on the underwater vehicle. The unit may be acceleration responsive using various types of units that are well known to those skilled in the art. The onboard digital computer 13 receives inertial measurements from the inertial measurement unit 12 and computes vehicle position with respect to an initialized reference. Because actual range position need not be known aboard the underwater vehicle, some of the navigational computations can be accomplished later in range computer 35, thus reducing the required complexity of the underwater system.

Acoustic transmitter 15 receives position information, at one second intervals, for example, from the inertial navigation computer 13, formats the data into a coded message, and transmits the message from the underwater vehicle by transmitter 15 and transducer 17. The coded acoustic signal 23 is received by underwater hydrophone 27 and processed by acoustic processor 33 and range computer 55 to reconstruct the original inertial position data.

A major advantage of inertial measurement underwater tracking system 11 is the lack of restraint placed on the receiving hydrophone location. The hydrophone may be surface or bottom mounted and needs only to be within sufficient range of the underwater vehicle to assure reliable acoustic telemetry reception.

Range computer 35 processes, in real-time, the inertial position data, may apply real-time offset and drift corrections, and displays and records the time history of vehicle location on the range. This allows for operations display, active control of exercises, range safety, vehicle recovery, and supplies a recorded history for post-run study and analysis. The computer site would normally be shore-based, but for portable range applications, would probably be onboard a surface craft. Other possibilities are onboard a submarine or in an aircraft flying overhead. In any case, the only major requirement is that a reliable means be implemented to obtain the inertial position data from the acoustic processor so that the range computer may operate on it.

The inertial position data, in addition to being transmitted acoustically from the underwater vehicle, is recorded in onboard digital recorder 19. The real-time acoustic telemetry of inertial position data will be subject to some errors and dropout due to environmental factors whereas the onboard recording of data provides continuous, error-free data for post-run analysis purposes.

Additional inertial parameters such as velocity, acceleration, angles, and angle rates may also be recorded to aid in the post-run analysis process. After vehicle recovery, the onboard recorded data is played back into the range computer, combined with all other updated operations information available, and processed into a maximum accuracy, continuous vehicle-run history.

In view of the foregoing it can be seen that the inertial measurement underwater tracking system 11 of the present invention supplies real-time tracking data for operations control, display, safety, and vehicle recovery and a maximum accurate post-run history of vehicle performance.

In FIG. 2 is schematically illustrated a specific implementation of the embodiment shown in FIG. 1. The system shown in FIG. 2 may be referred to as a dead reckoning inertial measurement system 41. This system includes a directional gyroscope 43 that provides an output signal that represents the yaw angle $\theta$ of the direction of travel of the underwater target 21. The output of directional gyroscope 43 is applied to the input of synchro/digital converter 45. It should be noted that the $\theta = 0°$ position of gyroscope 43 may be aligned with the launch direction of the underwater target or it may be positioned at a finite offset angle at launch. If the target is launched at a finite angle to the gyroscope 41 (where $\theta = A°$) then it is necessary to provide a correction factor (in this example a binary number representing A°) by subtracting $\theta = A°$ from the gyroscope output as illustrated by subtractor 47. The output of converter 45, which may be corrected by offset angle subtractor 47, is applied to one input of subtractor 49 as illustrated by $\theta_n$. $\theta_n$ represents the difference between the 0° launch angle and the angle of the vehicle axis at time $t_n$.

A clock 51 is provided that provides a clock signal C at one second intervals, for example. The clock period is selected to provide the desired definition of the vehicle course. The output of clock 51 is applied to counter 53 and to counter 55. The output of counter 53 is applied to one input of multiplier 57. The other input to multiplier 57 is $K_1$ which represents a correction factor for the gyroscope 43 which takes into account earth rotation rate and known gyroscope drift rate. This correction factor is a constant for any particular run, and is in degrees/second and it is therefore necessary to take into consideration the total time of travel of the vehicle at time $t_n$. This correction factor becomes significant when the vehicle is traveling a substantial period of time, for example, 10 to 15 minutes, which is not unusual for underwater targets, such as torpedos. The output of multiplier 57 ($K_1 t_n$, which represents degrees of error) is subtracted from the output of subtractor 47 in subtractor 49.

The output of subtractor 49 is applied in parallel to the inputs of cosine device 59 and sine device 61. The output of cosine device 59 is applied to one input of multiplier 63 and the output of sine device 61 is applied to one input of multiplier 65. The foregoing description is directed to determining directions in the x,y components of the cartesian or rectangular coordinate system.

In order to determine position of the underwater target it is still necessary to determine distance of travel. This is achieved in this embodiment by knowing the correlation between the speed of propeller 67 and the speed of the underwater vehicle. Knowing this and the time of travel, then the distance of travel can be determined. This is achieved by providing a speed measuring device 69 for propeller 67. Device 69 may be an LED device that provides 10 output pulses, for example, per revolution of propeller 67. The output of device 69 is applied to counter 55. Counter 55 reads out to multiplier 71 upon the occurrence of each clock pulse C (one second intervals). Upon read-out the counter is reset for the next clock period C. The output of counter 55 is applied to the input of multiplier 71 where it is multiplied by the constant $K_2$ (advance ratio) which represents the distance the vessel travels per revolution of propeller 67. The output of multiplier 71 represents the distance $S_n$ (in feet, for example) the vessel travelled during the clock period C. The output of multiplier 71 is applied to the other inputs of multipliers 63 and 65. The output of multiplier 65 is $\Delta Y_n$ and the output of multiplier 63 is $\Delta X_n$ which are respectively applied to the inputs of integrators 73 and 75 which respectively provide outputs of $Y_n$ and $X_n$. The initial conditions of integrators 73 and 75 are established by the $Y_o$ and $X_o$ inputs respectively.

The depth of the target is determined by pressure transducer 77, the output of which is converted to a digital format by A/D converter 79, the output of which is applied to one input of multiplier 81. The other input to multiplier is a constant $K_3$ (in$^2 \times$ ft/lbs.) which converts the pressure to depth $Z_n$.

The following are the implemented general equations:

$$X_n = X_{n-1} + \Delta X$$

$$Y_n = Y_{n-1} + \Delta Y$$

At time $t_n$ $$\Delta X_n = \Delta S_n \cos(\theta_n - K_1 t_n)$$

$$\Delta Y_n = \Delta S_n \sin(\theta_n - K_1 t_n)$$

The following table I illustrates the time versus position (x,y) relationship of the general equations:

TABLE I

| time | position (x,y) |
|---|---|
| $t_0$ | $X_0$ |
|  | $Y_0$ |
| $t_1$ | $X_1 = X_0 + \Delta S_{0-1} \cos(\theta_1 - Kt_1)$ |
|  | $Y_1 = Y_0 + \Delta S_{0-1} \sin(\theta_1 - Kt_1)$ |
| $t_2$ | $X_2 = X_1 + \Delta S_{2-1} \cos(\theta_2 - Kt_2)$ |
|  | $Y_2 = Y_2 + \Delta S_{2-1} \sin(\theta_2 - Kt_2)$ |
| $t_3$ | $X_3 = X_2 + \Delta S_{3-2} \cos(\theta_3 - Kt_3)$ |
|  | $Y_3 = Y_2 + \Delta S_{3-2} \sin(\theta_3 - Kt_3)$ |
| . | . |
| . | . |
| . | . |
| $t_n$ | $X_n = X_{n-1} + \Delta S_{n-1} \cos(\theta_n - Kt_n)$ |
|  | $Y_n = Y_{n-1} + \Delta S_{n-1} \sin(\theta_n - Kt_n)$ |

What is claimed is:

1. An underwater tracking system comprising:
   (a) an underwater vehicle;
   (b) an inertial measurement unit mounted on said vehicle including measuring means for measuring information from which the position of said vessel may be defined;
   (c) a position device for determining the position of said vessel from the output of said inertial measurement unit;
   (d) the output of said inertial measurement unit applied to the input of said position device;
   (e) a transmitter; and
   (f) the output of said position device applied to the input of said transmitter for transmission to a remote receiver for determining the position of said underwater vehicle.

2. The system of claim 1 wherein:
   (a) said vehicle includes a recorder wherein the output of said position device is applied to the input of said recorder.

3. The system of claim 2 including:
   (a) a floating vehicle including an acoustic processor; and
   (b) the output of said remote receiver connected to the input of said acoustic processor for processing and retransmission to a remote range processor.

4. The system of claim 3 wherein:
   (a) said range processor is located on land and includes a range computer and a real-time tracking display for defining the location of said underwater vehicle.

5. The system of claim 1 wherein:
   (a) said measuring means includes a direction gyroscope and a vehicle speed measuring device.

6. The system of claim 5 including:
   (a) cartesian coordinate conversion means;
   (b) said direction gyroscope measuring the direction of said vehicle in the spherical coordinate system; and
   (c) the output of said direction gyroscope and said speed measuring device connected to the input of said cartesian coordinate conversion means for determining the vehicle position in the cartesian coordinate system.

7. The system of claim 5 including:
   (a) offset angle means; and
   (b) the output of said gyroscope connected to the input of said offset angle means for initializing the output of said gyroscope.

8. The system of claim 7 including:
   (a) gyroscope correction means for correcting the gyroscope output for earth rotation rate and known gyroscope drift rate.

9. The system of claim 8 including:
   (a) a clock;
   (b) said gyroscope correction means including a first counter and a first multiplier;
   (c) the output of said clock connected to the input of said first counter the output of which is connected to one input of said first multiplier; and
   (d) the other input to said first multiplier providing a correction constant which is a function of latitude.

10. The system of claim 9 including:
    (a) a subtractor;
    (b) the output of said offset angle means connected to one input of said subtractor and the output of said first multiplier connected to the other input of said subtractor to provide a corrected and initialized vehicle direction in the spherical coordinate system.

11. The system of claim 10 including:
    (a) a sine device and a cosine device;
    (b) the output of said subtractor applied to the input of said sine device and to the input of said cosine device to convert the output of said subtractor from the spherical to the cartesian coordinate system.

12. The system of claim 11 wherein:
    (a) said vehicle speed measuring device includes a second counter for counting the revolutions of a propeller that is driving said vehicle;
    (b) the output of said clock connected to the input of said second counter;
    (c) a second multiplier, the output of said second counter connected to one input of said second multiplier; and
    (d) the other input to said second multiplier providing an advance ratio constant which represents the distance the vessel travels per revolution of the propeller whereby the output of said second multiplier represents the distance said vessel travels during the clock interval of said clock.

13. The system of claim 12 including:
    (a) third and fourth multipliers;
    (b) the output of said cosine device connected to one input of said third multiplier and the output of said second multiplier connected to the other input of said third multiplier whereby the output of said third multiplier provides the vehicle distance traveled in the X direction of the cartesian coordinate system during the clock period of said clock; and (c) the output of said sine device connected to one input of said fourth multiplier and the output of said second multiplier connected to the other input of said fourth multiplier whereby the output of said fourth multiplier provides the vehicle distance traveled in the Y direction of the cartesian coordinate system during the clock period of said clock.

14. The system of claim 13 including:
(a) first and second integrators;

(b) the output of said third multiplier connected to the input of said first integrator the output of which provides the total vehicle distance traveled in the X direction; and
(c) the output of said fourth multiplier connected to the input of said second integrator the output of which provides the total vehicle distance traveled in the Y direction.

* * * * *